(12) United States Patent
Burow et al.

(10) Patent No.: US 8,328,680 B2
(45) Date of Patent: Dec. 11, 2012

(54) METHOD FOR CONTROLLING THE OPERATION OF A MOTOR VEHICLE

(75) Inventors: Clemens Burow, München (DE); Florian Kramer, Graz (AT); Patrick Schatz, Prebl (AT); Mario Summer, Leibnitz (AT)

(73) Assignee: MAGNA STEYR Fahrzeugtechnik AG & Co KG, Graz (AT)

(*) Notice: Subject to any disclaimer, the term of this patent is extended or adjusted under 35 U.S.C. 154(b) by 303 days.

(21) Appl. No.: 12/854,237

(22) Filed: Aug. 11, 2010

(65) Prior Publication Data

US 2011/0039656 A1   Feb. 17, 2011

Related U.S. Application Data

(60) Provisional application No. 61/232,802, filed on Aug. 11, 2009.

(51) Int. Cl.
*B60K 1/02* (2006.01)

(52) U.S. Cl. ............................................................ 477/3
(58) Field of Classification Search .................... 477/3, 4
See application file for complete search history.

(56) References Cited

U.S. PATENT DOCUMENTS 7,032,697 B2 * 4/2006 Lee ............................ 180/65.25

* cited by examiner

*Primary Examiner* — Dirk Wright
(74) *Attorney, Agent, or Firm* — Jordan IP Law, LLC; Todd A. Vaughn

(57) ABSTRACT

A motor vehicle having a drive train and a motor unit which can be coupled to the drive train, and at least one electric machine. A freewheel mode is activated to increase the energy efficiency so that the motor vehicle is neither powered nor decelerated by the motor unit, thus allowing the wheels of the motor vehicle to essentially roll freely. In the freewheel mode, the electric machine is operated as a motor which introduces a freewheel mode pull torque to the drive train.

20 Claims, 1 Drawing Sheet

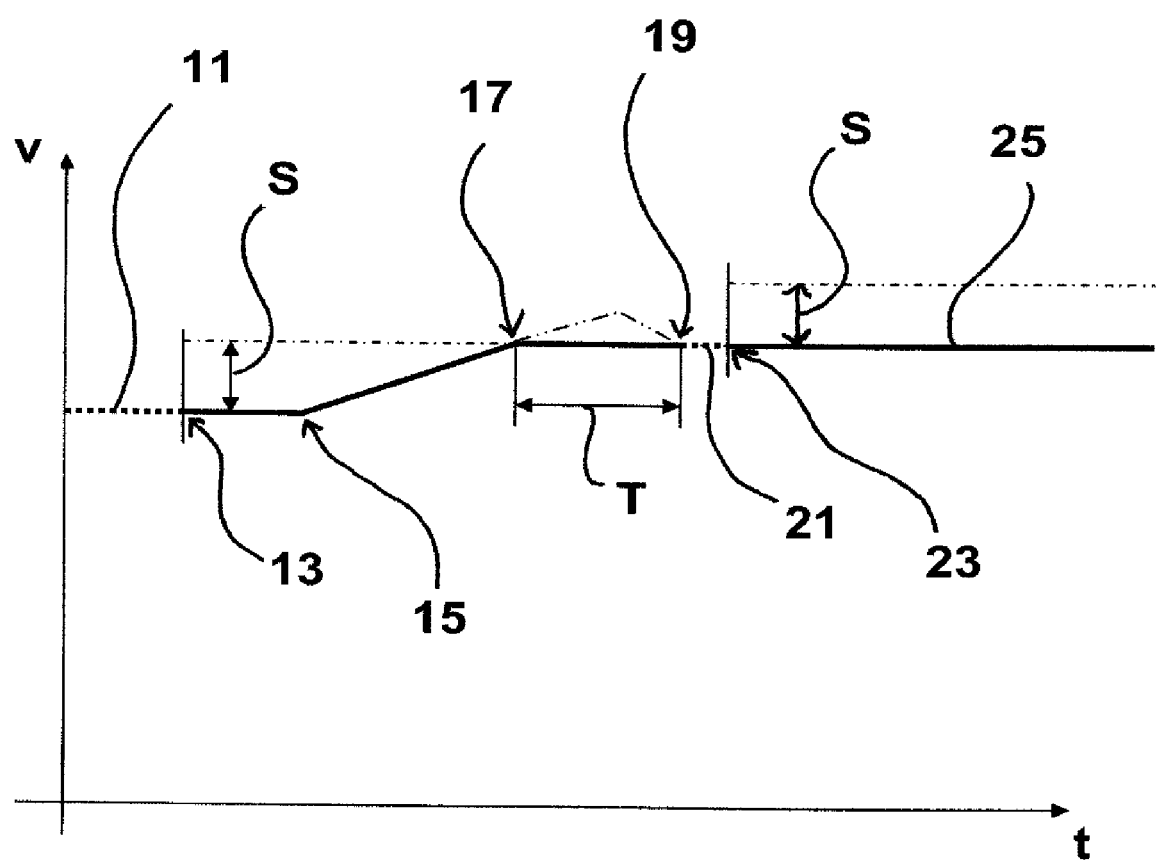

METHOD FOR CONTROLLING THE OPERATION OF A MOTOR VEHICLE

CROSS-REFERENCE TO RELATED APPLICATIONS

The present application claims priority under 35 U.S.C. §119 to U.S. Provisional Patent Application No. 61/232,802 (filed on Aug. 11, 2009), the full contents of which is hereby incorporated by reference in its entirety.

BACKGROUND

In conventional motor vehicles having internal combustion engines, such a freewheel mode, can be, for example, activated by turning off the internal combustion engine and/or mechanically separating it from the drive train. The available kinetic energy of the rolling vehicle can be utilized in this way, thereby saving fuel.

In hybrid vehicles having a motor unit with an internal combustion engine and at least one electric machine, a freewheel mode can also be created, for example, by turning off the internal combustion engine, separating the internal combustion engine from the drive train, and turning off the electric machine in addition, if required.

The efficiency of a freewheel mode can be reduced due to losses, which occur when a turned-off electric machine is still being turned. In contrast, the problem in the case of a mechanical separation of the electric machine from the drive train is that a corresponding elaborate coupling including an actuation apparatus and a control must be at disposal, and furthermore, that the decoupled electric machine is not available for regenerative braking.

SUMMARY

Embodiments are related to a method for controlling the operation of a motor vehicle having a drive train and a motor unit having at least one electric machine, which can be coupled to the drive train, such that a freewheel mode of operation is activated to increase the energy efficiency so that the motor vehicle is neither powered nor decelerated by the motor unit, essentially allowing it to roll freely.

Embodiments are related to a method for controlling the operation of a motor vehicle which allows an efficient freewheel mode in partially or entirely electrically-operated motor vehicles.

In accordance with embodiments, a method for controlling the operation of a motor vehicle having a drive train and a motor unit having at least one electric machine which are coupled thereto, the method including at least one of the following: activating a freewheel mode in the motor vehicle to increase the energy efficiency therein such that the motor vehicle is neither powered nor decelerated by the motor unit, thereby permitting the motor vehicle to roll freely, such that in the freewheel mode, the electric machine is operated as a motor, which introduces a freewheel mode pull torque to the drive train.

In accordance with embodiments, when in the freewheel mode, the electric machine is operated as a motor, which introduces a freewheel mode pull torque to the drive train. Contrary to the prevailing trends in the subject field to prevent entirely, the transfer of pull and push torques from the motor unit to the drive train in a freewheel mode, the electric machine in accordance with embodiments is controlled such that it does bring about a pull torque in the freewheel mode, albeit a relatively low one.

In accordance with embodiments, the freewheel mode pull torque is thereby sufficiently high to compensate, or to overcome in a minimal way, any mechanical resistance in the drive train. It is thereby accomplished that the vehicle is rolling as if being mechanically decoupled from the drive. A separate apparatus for mechanically decoupling the electric machine from the drive train is not necessary. Rather, the state of the mechanical decoupling is "simulated," for instance, by overcoming the mechanical resistances just so, by a defined minimal value.

In accordance with embodiments, the freewheel mode pull torque is sufficiently high enough that interacting gear tooth components of the drive train lie adjacent to one another at the traction flank. For example, a transmission gear provided between the electric machine and the wheels of the motor vehicle is always held at the traction flank of the gear teeth. This results in a particularly low noise generation. The suppression of noise emissions of the transmission components is of particularly great importance in primarily or entirely electrically operated vehicles, because due to the absence of internal combustion motor noises, even relatively minor noise sources are subjectively perceived as very bothersome.

In accordance with embodiments, the maximum freewheel mode pull torque is 20 Nm. In accordance with embodiments, the maximum freewheel mode pull torque can be in a range between 3 Nm and 8 Nm, and particularly about 5 Nm. Compared to traditional pull torques generated during normal vehicle operation by the motor unit, the freewheel mode pull torque is thus, relatively low.

In accordance with embodiments, with the exception of the freewheel mode pull torque, no additional pull torques are introduced to the drive chain in the freewheel mode. In this way, the freewheel mode differs significantly from a so-called tempo mate, such that the selected vehicle speed is maintained by automatically applying a suitable pull torque. This is not the case in the freewheel mode; instead, the vehicle speed continuously decreases in the activated freewheel mode, particularly in uphill driving, because the insubstantial freewheel mode pull torque is not sufficient to compensate the drive resistances.

In accordance with embodiments, the torsional moment introduced to the drive train by the electric machine at the activation and/or deactivation of the freewheel mode is increased or decreased in a ramp-like fashion. The change of the torsional moment takes place with a gradient of predefined incline so that a gentle torsional moment progression is achieved. Thus, the driver comfort in particular is increased since torsional moment jerks are avoided.

In accordance with embodiments, in the freewheel mode, at least one electric machine of the motor unit can be operated as a generator if a deceleration criteria is met. Thus, a recuperation, that is, a recovery of usable energy, can take place during deceleration. The electric energy generated by the generator, can be stored in a battery of the motor vehicle, for example. The deceleration criteria can be met, for example, if the motor vehicle is being operated on a downward slope when in freewheel mode. An electric motor deceleration such as this can thus, be utilized on a downward slope to allow a continued freewheel operation without running the risk of an excessive increase in speed.

In accordance with embodiments, the freewheel mode can be deactivated if the electric machine is operated as a generator beyond a pre-set period of time. This can make particularly good sense for safety reasons. Likewise, the freewheel mode operation can also be aborted for safety reasons if the vehicle speed exceeds a predetermined threshold value.

In accordance with embodiments, the deceleration criteria can also be met if after an activation of the freewheel mode, an increase in the vehicle speed exceeds a predetermined threshold value. Thus, as soon as a sudden increase in the vehicle speed occurs in the freewheel mode, the electric machine is operated as a generator, thus initiating a recuperation in order to restore the original speed of the vehicle by electric motor deceleration.

In accordance with embodiments, the instant vehicle speed can be set as the base value for the increase of the vehicle speed when activating the freewheel mode. Thus, a current reference value for the vehicle speed can be set at the onset of each freewheel mode in order to monitor the time-based development of the vehicle speed based thereon, and thus, determining an exceedingly high increase, i.e., an exceedingly high acceleration of the vehicle.

In accordance with embodiments, the freewheel mode can be deactivated if the driver of the motor vehicle operates the gas pedal or the brake pedal, particularly with a predetermined stroke, or if a driver assistance system issues a control order for the drive train. A deactivation of the freewheel mode can be omitted if the gas or brake pedals are only minimally used so that the energy advantages continue to be effective. However, once the driver brakes hard or accelerates, the freewheel mode is discontinued to allow an unobstructed adaptation to the traffic flow. Likewise, the freewheel mode is aborted for safety reasons if a driver assistance system like ESP intervenes with the drive train in any way.

In accordance with embodiments, the motor vehicle preferably is at least predominantly electrically operated. With motor vehicles such as this, also called "dominant electric," the benefits of embodiments are particularly effective.

In accordance with embodiments, the motor unit may include an internal combustion engine that can be turned off and/or is mechanically decoupled from the drive chain once the freewheel mode is activated. In this way, the energy losses of the internal combustion engine are kept to a minimum.

In accordance with embodiments, the freewheel mode can be activated if the driver operates a corresponding control element. For example, the driver can activate the freewheel mode via a push button or selector lever provided on the steering wheel or the dashboard. Alternatively, the freewheel mode could also be activated automatically, for example, based on a transition between a zero load mode and a traction mode operation. Likewise, a defined position of the driving pedal can be used as criteria for the activation of the freewheel mode. A combination of manual and automatic activation of the freewheel mode can also be provided.

In accordance with embodiments, the freewheel mode is preferably indicated to the driver of the vehicle visually via, for example, an indicator light or as a message on a display screen. This is advantageous since it encourages the driver to adopt an anticipatory and efficient driving style.

In accordance with embodiments, the freewheel mode can only be activated if the vehicle speed is above a threshold value.

In accordance with embodiments, a control device for a motor vehicle of the aforementioned kind is proved which activates a freewheel mode. The control device can also control or otherwise operate the electric machine as a motor in the freewheel mode, which introduces a freewheel mode pull torque in the drive train.

DRAWINGS

Example FIG. 1 illustrates operation of a motor vehicle in a speed-time-diagram.

DESCRIPTION

As illustrated in example FIG. 1, driving speed V of an exemplary motor vehicle dependent on time t is illustrated. Traditional vehicle operation phases are illustrated as hatched lines and freewheel mode phases illustrated as solid lines. In accordance with embodiments, the motor vehicle can be an electric vehicle solely powered by an electric machine, or a hybrid vehicle powered by both an electric machine and an internal combustion engine. The operation of the motor vehicle can be regulated by a control device which transmits applicable control signals to the electric machine, and/or to the internal combustion engine and/or other components of the motor vehicle.

Initially, the motor vehicle is operated in a normal driving mode during time segment 11, in which case the electric machine generates the torsional moment necessary for propulsion. At time segment 13, the driver signals via a suitable input apparatus that a freewheel mode of the motor vehicle is requested. In response, the control device activates the freewheel mode, and thus, the electric machine is triggered such that it is operated as a motor. This, in turn, introduces a freewheel mode-pull torque suitable for the compensation of drag loss to the drive train. The freewheel mode-pull torque is comparatively low and can be about 5 Nm in a typical application. An amount such as this is sufficient to overcome any mechanical resistances in the drive train. Thus, the driver has the sensation of a free-rolling vehicle, as if the wheels of the vehicle were mechanically separated from the drive. Since the freewheel mode pull torque generated by the electric machine prevents a tooth side switching of the tooth pairings of the gear box components, the driving noise generation is reduced to a minimum in the freewheel mode.

At time segment 15, the vehicle enters a downward slope causing a linear increase in driving speed V. Initially, the control device does not interfere, i.e., the motor vehicle essentially freely rolls down the slope, gradually increasing speed. However, once the acceleration reaches speed threshold value S at time segment 17, the control device interferes and switches the electric machine from a motor operation to a generator operation. As a result, the vehicle is decelerated electromotively to prevent any further increase in speed. Due to the generator operation, the braking energy can be utilized to charge the energy storage of the motor vehicle, which is referred to as recuperation. Concurrently with the switching of the electric machine from motor operation to generator operation, a time variable (timer) is started at time segment 17.

As soon as the time variable indicates at time segment 19 that time threshold value T has been exceeded, the freewheel mode is aborted for safety reasons, and the vehicle is once again operated in a normal driving mode during time segment 21. This normal driving mode continues until a new request for freewheel mode is signaled at time segment 23. At the subsequent re-activation of the freewheel mode, the instant driving speed V is set as the new initial value for the increase in driving speed V. In other words, the threshold value V is respectively relative to the original level of the driving speed V at the point in time t of the activation of the freewheel mode. During time segment 25, the motor vehicle is continuously operated in the freewheel mode, wherein in this case, the vehicle speed V does not increase and accordingly, no deceleration measures are initiated. If the driver of the motor vehicle operates the gas pedal of the brake pedal with a predetermined stroke, the freewheel mode is deactivated.

In order to avoid unpleasant torsional moment jerks during a switch between freewheel mode and standard mode, the torsional moment introduced to the drive train by the electric machine is not erratically increased or decreased during the activation and deactivation of the freewheel mode, but is gradually, for example, ramp-like, adjusted to the respective instant value.

The control unit ensures that the driver safely navigates the vehicle downhill as usual, by systematic deceleration, similar to traditional vehicles with internal combustion engines. If a safety-relevant vehicle system like ESP or ABS intervenes in the drive train, the freewheel mode is also promptly aborted. Essentially, the freewheel mode is only permitted above a predetermined vehicle speed.

The manual and automatic triggering of the freewheel mode can also be combined such that if suitable conditions for a freewheel mode exist, it is suggested to the driver via a corresponding prompt to activate the freewheel mode manually. A procedural method such as this can assist the driver to develop a particularly anticipatory and energy-saving driving style.

Embodiments allow a particularly energy-saving and low noise freewheel operation in hybrid or electric vehicles.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art

What is claimed is:

1. A method for controlling the operation of a motor vehicle having a drive train and a motor unit having at least one electric machine which are coupled thereto, the method comprising:
    activating a freewheel mode in the motor vehicle permitting wheels of the motor vehicle to roll freely, thereby increasing the energy efficiency of the motor vehicle such that the motor vehicle is neither powered nor decelerated by the motor unit,
    wherein in the freewheel mode, the electric machine is operated as a motor which introduces a freewheel mode pull torque to the drive train.

2. The method of claim 1, wherein the freewheel mode pull torque is sufficiently high to at least one of compensate and overcome in a minimal way, any mechanical resistance in the drive train.

3. The method of claim 1, wherein the freewheel mode pull torque is sufficient in order that interacting gear tooth components of the drive train lie adjacent to one another at a traction flank.

4. The method of claim 2, wherein the freewheel mode pull torque is sufficient in order that interacting gear tooth components of the drive train lie adjacent to one another at a traction flank.

5. The method of claim 1, wherein the freewheel mode pull torque is 20 Nm.

6. The method of claim 5, wherein no other pull torques are introduced to the drive train in the freewheel mode other than the freewheel mode-pull torque.

7. The method of claim 1, wherein the freewheel mode pull torque is in a range between 3 Nm and 8 Nm.

8. The method of claim 7, wherein no other pull torques are introduced to the drive train in the freewheel mode other than the freewheel mode-pull torque.

9. The method of claim 1, wherein the freewheel mode pull torque is 5 Nm.

10. The method of claim 1, wherein no other pull torques are introduced to the drive train in the freewheel mode other than the freewheel mode-pull torque.

11. The method of claim 1, wherein a torsional moment introduced by the electric machine to the drive train is at least one of ramp-like increased and ramp-like decreased when the freewheel mode is at least one of activated and deactivated.

12. The method of claim 1, wherein in the freewheel mode, the at least one electric machine is operated as a generator when a predetermined deceleration criteria is met.

13. The method of claim 12, wherein the freewheel mode is deactivated when the at least one electric machine is operated as a generator above a predetermined time frame.

14. The method of claim 13, wherein the predetermined deceleration criteria is met when an increase in the vehicle speed exceeds a predetermined threshold value after an activation of the freewheel mode.

15. The method of claim 14, wherein an instant vehicle speed is set as a base value for an increase in the vehicle speed when the freewheel mode is activated.

16. The method of claim 15, wherein the freewheel mode is deactivated when at least one of a gas pedal of the vehicle is engaged, a brake pedal of the vehicle is engaged, and a driver assistance system issues a control order for the drive train.

17. The method of claim 1, wherein the motor vehicle is at least predominantly electrically operated.

18. The method of claim 1, wherein the motor unit comprises an internal combustion engine that is at least one of turned off and mechanically decoupled from the drive train once the freewheel mode is activated.

19. A motor vehicle comprising:
    a drive train;
    a motor unit having at least one electric machine; and
    a control device operatively connected to the at least one electric machine, the control device adapted to activate a freewheel mode permitting wheels of the motor vehicle to roll freely and thereby increase the energy efficiency of the motor vehicle such that the motor vehicle is neither powered nor decelerated by the motor unit,
    wherein the control device is further adapted to operate the at least one electric machine as a motor in the freewheel mode, said motor introducing a freewheel mode pull torque to the drive train.

20. A motor vehicle having a drive train and a motor unit having at least one electric machine, the motor vehicle comprising:
    a control device operatively connected to the at least one electric machine, the control device adapted to activate a freewheel mode permitting wheels of the motor vehicle to roll freely and thereby increase the energy efficiency of the motor vehicle such that the motor vehicle is neither powered nor decelerated by the motor unit,
    wherein the control device is further adapted to operate the at least one electric machine as a motor in the freewheel mode, said motor introducing a freewheel mode pull torque to the drive train.

* * * * *